UNITED STATES PATENT OFFICE.

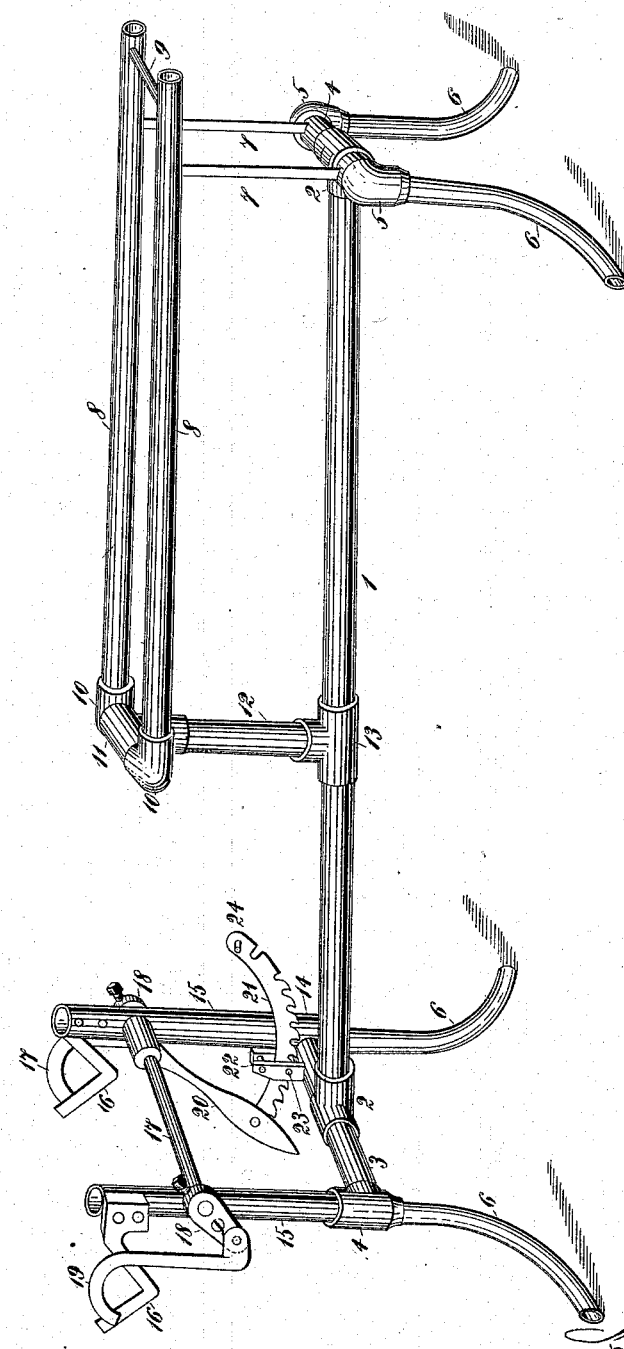

FRANK H. PIERCE, OF SAN JOSÉ, CALIFORNIA.

BICYCLE-STAND.

SPECIFICATION forming part of Letters Patent No. 528,028, dated October 23, 1894.

Application filed July 13, 1894. Serial No. 517,401. (No model.)

*To all whom it may concern:*

Be it known that I, FRANK H. PIERCE, a citizen of the United States, residing in San José, Santa Clara county, State of California, have invented a new and useful Improvement in Bicycle-Stands, of which the following is a specification.

My invention relates especially to devices employed for holding bicycles in position while assembling, repairing or cleaning, and has for its object the provision of a cheap, simple and effective stand for firmly holding a bicycle in an inverted position.

To attain the desired end, my invention consists in certain novel and useful combinations or arrangements of parts, and peculiarities of construction and operation, all of which will be hereinafter first fully described, and then pointed out in the claims.

The accompanying drawing forming a part hereof, is a perspective view of my bicycle stand.

Similar numerals of reference, wherever they occur, indicate corresponding parts.

The main frame of the stand is preferably made of gas pipe, the parts being united by ordinary pipe connections.

1 is a longitudinal pipe or reach, connected at each end by a T, 2, to cross-pieces 3 and 4. At each end of the piece 4, are elbows, 5, engaging with feet, 6. Extending upward from the piece 4, are rods, 7, which engage with horizontal pipes, or pieces, 8.

9 is a stay-rod passing between the pieces 8 near their outer ends.

10 are elbows connecting the inner ends of pieces 8 to a cross-piece 11, and 12 is a vertical pipe or piece passing downward from the cross-piece 11 to a T 13, upon the horizontal reach, 1.

14 are T pieces at each extremity of cross-piece 3, engaging with supporting feet 6, and vertical standards 15. At the top of the standards 15 are secured hooks, 16.

17 is a rod, passing through perforations in the standards 15, and bearing at each extremity cranks, 18, to which are secured curved arms or hooks, 19. Fixed to the rod 17, is a lever arm, 20, bearing a notched segment, 21, passing through guides 22, fixed to the cross-piece 3, said guides being provided with a pin, 23, arranged to engage with the notches in the segment 21.

24 is a stop-pin to prevent the escape of the notched segment from the guides, 22.

The parts of the stand upon which the bicycle rests may be padded with leather.

When constructed and arranged in accordance with the foregoing description, the operation of my bicycle stand is as follows: The bicycle to be repaired, dismembered, cleaned, or otherwise operated upon, is inverted, the saddle resting upon the horizontal pieces, 8, which constitute a horizontal support or rest for the saddle of a bicycle and are of such a length as to receive the saddle upon any size of bicycle. The lever arm 20 is drawn outward until the last notch in the segment 21 engages with the pin, 23; this operation throwing the hooks 19 back out of the way. The handle bar of the bicycle is now rested in the hooks, 16, which constitute a transverse support for the handle bar and by then pushing the lever 20 downward, the hooks 19 pass over the handle bar, the notched segment firmly locking the said hooks in position, and firmly holding the bicycle in such a manner that the wheels, &c., may be manipulated or removed, and the frame of the machine securely held against displacement.

It will be observed that the hooks 17 and 19 together constitute a locking or holding device for the handle bar which encircles the same. This is desirable because, when the bicycle rests, in an inverted position, upon the saddle and handle bar only, there is danger of the forward end of the bicycle being lifted,—the saddle serving as a fulcrum,—while the rear wheel is being manipulated.

Having now fully described my invention, what I claim as new therein, and desire to secure by Letters Patent, is—

1. In a device of the character herein specified, the combination with a support for the saddle of an inverted bicycle, of a support for the handle bar connected therewith, and encircling means for locking the handle bar to said support, substantially as shown and described.

2. In a device of the character herein specified, the combination with the main frame mounted upon supporting legs, of a rest for the saddle of an inverted bicycle, consisting of longitudinal substantially parallel bars and encircling devices for the handle which hold it against movement, substantially as shown and described.

3. In a device of the character herein specified, the combination with the supporting legs, of standards mounted thereabove and bearing rigid hooks for receiving the handle bar of an inverted bicycle, movable hooks arranged to pass over the handle bar, and means for securing said hooks in position, substantially as shown and described.

4. In a bicycle stand, a horizontal reach or bar, mounted upon supporting legs; longitudinal saddle receiving bars mounted above the reach; standards projecting above the reach, opposite to the saddle support, and bearing fixed hooks forming a handle bar support; movable hooks mounted upon a shaft, and arranged to pass over the handle bar; a manipulating lever fixed to said shaft, and means for locking said lever in position, the whole combined and arranged to operate, substantially as shown and described.

FRANK H. PIERCE.

Witnesses:
  LEW C. BLACK,
  C. N. RAVLEN.